(12) United States Patent　　　(10) Patent No.:　US 12,617,197 B2
Kim　　　　　　　　　　　　　　　(45) Date of Patent:　　　May 5, 2026

(54) APPARATUS AND METHOD OF PEELING FILM

(71) Applicant: Samsung Display Co., LTD., Yongin-si (KR)

(72) Inventor: Yunmin Kim, Yongin-si (KR)

(73) Assignee: Samsung Display Co., LTD., Yongin-si (KR)

( * ) Notice: Subject to any disclaimer, the term of this patent is extended or adjusted under 35 U.S.C. 154(b) by 211 days.

(21) Appl. No.: 18/124,083

(22) Filed: Mar. 21, 2023

(65) Prior Publication Data

US 2024/0042750 A1　　Feb. 8, 2024

(30) Foreign Application Priority Data

Aug. 3, 2022　(KR) ......................... 10-2022-0096799

(51) Int. Cl.
　　*B32B 43/00*　　　　(2006.01)
(52) U.S. Cl.
　　CPC .................................. *B32B 43/006* (2013.01)
(58) Field of Classification Search
　　CPC ... B32B 43/006; B32B 2459/00; B32B 38/10; B29C 61/02; B29C 63/0013; B29K 2995/0049; B65H 41/00; B65H 29/54; B65H 2301/51122; B65H 2701/1726
　　See application file for complete search history.

(56) References Cited

U.S. PATENT DOCUMENTS

| | | | |
|---|---|---|---|
| 10,843,400 B2 * | 11/2020 | Han | B65H 29/54 |
| 2018/0201007 A1 * | 7/2018 | Chen | B32B 39/00 |

FOREIGN PATENT DOCUMENTS

| | | |
|---|---|---|
| KR | 10-1456222 | 11/2014 |
| KR | 10-1765297 | 8/2017 |
| KR | 10-1818473 | 1/2018 |
| KR | 10-2019-0042131 | 4/2019 |
| KR | 10-2041553 | 11/2019 |

OTHER PUBLICATIONS

AutomationDirect.com "Proximity Sensors for Object Detection from AutomationDirect" YouTube Video dated May 4, 2015. Accessed at <https://www.youtube.com/watch?v=tpXW6qWoJGA> (Year: 2015).*

* cited by examiner

*Primary Examiner* — Alex B Efta
*Assistant Examiner* — Alexander S Wright
(74) *Attorney, Agent, or Firm* — F. CHAU & ASSOCIATES, LLC

(57)　　　　　ABSTRACT

A film peeling apparatus includes a first driver connected to a frame, a second driver connected to the frame, a first gripper connected to the first driver, a second gripper connected to the second driver, and a grip support spaced apart from the first gripper and the second gripper. The grip support and the first gripper grip a release tape attached to an end of a protective film attached to a panel and extending to an outside of the panel. The grip support and the second gripper grip the end of the protective film to which the release tape is attached.

11 Claims, 14 Drawing Sheets

| | |
|---|---|
| Position panel on stage | ⎯ S100 |
| First gripper ⎯ grips release tape | ⎯ S200 |
| First gripper ⎯ starts peeling operation | ⎯ S300 |
| Second gripper ⎯ grips protective film | ⎯ S400 |
| Peel off protective film completely | ⎯ S500 |

APPARATUS AND METHOD OF PEELING FILM

CROSS-REFERENCE TO RELATED APPLICATION

This application claims priority to and benefits of Korean Patent Application No. 10-2022-0096799 under 35 U.S.C. § 119, filed in the Korean Intellectual Property Office (KIPO) on Aug. 3, 2022, the entire contents of which are incorporated herein by reference.

BACKGROUND

1. Technical Field

The disclosure relates to a film peeling apparatus and a method of peeling a film, which is capable of improving peeling efficiency.

2. Description of the Related Art

A display device, which is a device that displays an image, includes a liquid crystal display (LCD), a plasma display panel (PDP), an organic light emitting diode device (OLED device), a field emission display (FED), an electrophoretic display device, and the like.

Various types of panels or optical films are used in a field of manufacturing such a display device. Such panels or optical films are processed while moving in various process spaces during a process, and in this case, they are often handled in a state where a protective film is attached thereon to prevent contamination or damage to surfaces of the panels or optical films during process space movement. This protective film may be removed prior to performing a bonding or assembly process on the panels.

It is to be understood that this background of the technology section is, in part, intended to provide useful background for understanding the technology. However, this background of the technology section may also include ideas, concepts, or recognitions that were not part of what was appreciated by those skilled in the pertinent art prior to a corresponding effective filing date of the subject matter disclosed herein.

SUMMARY

Embodiments provide a film peeling apparatus capable of improving peeling efficiency.

Embodiments also provide a method of peeling a film, which is capable of improving peeling efficiency.

However, embodiments of the disclosure are not limited to those set forth herein. The above and other embodiments will become more apparent to one of ordinary skill in the art to which the disclosure pertains by referencing the detailed description of the disclosure given below.

An embodiment provides a film peeling apparatus including a frame; a first driver and a second driver connected to the frame; a first gripper connected to the first driver; a second gripper connected to the second driver; and a grip support spaced apart from the first gripper and the second gripper. The grip support and the first gripper may grip a release tape attached to an end of a protective film attached to a panel and extending to an outside of the panel. The grip support and the second gripper may grip the end of the protective film to which the release tape is attached.

The grip support may include a first surface and a second surface facing the first surface. The first surface may be in contact with the first gripper and the second surface may be in contact with the second gripper.

The grip support may include an anti-slip portion, and the anti-slip portion may form a second surface of the grip support.

The first gripper may bring the release tape into contact with the first surface of the grip support and grip the release tape depending on a control of the first driver.

The first gripper may further include a film detection sensor that detects whether the release tape is gripped.

The second gripper may include a plurality of links that rotate depending on a control of the second driver.

The second gripper may include a grip bar connected to the links and including a bent portion at an end of the grip bar.

The bent portion of the second gripper may bring the protective film into contact with the second surface of the grip support and grip the protective film depending on a control of the second driver.

The second gripper may include a bent portion bent at an end of the second gripper, and the second driver may horizontally move the second gripper so that the bent portion of the second gripper is in contact with the second surface of the grip support.

The first gripper may grip the release tape and moves to peel a portion of the protective film.

The second gripper may grip the portion of the protective film peeled off by the first gripper.

The first gripper and the second gripper may simultaneously peel the portion of the protective film.

An embodiment provides a method of peeling a film using a film peeling apparatus including a first gripper and a second gripper. The method includes positioning a panel to which a protective film is attached on a stage; gripping a release tape attached to a first end of the protective film by the first gripper; gripping the first end of the protective film to which the release tape is attached by the second gripper; and peeling the protective film by the film peeling apparatus moving from a first end of the panel to a second end of the panel.

The second gripper may include a plurality of links.

The second gripper may include a grip bar connected to the links and including a bent portion at an end of the grip bar, and the bent portion may grip the protective film.

The gripping of the release tape by the first gripper may precede the gripping of the first end of the protective film by the second gripper.

The method may further include, after the gripping of the release tape by the first gripper, moving the first gripper and peeling a portion of the protective film.

The second gripper may grip the portion of the peeled protective film.

The gripping of the protective film by the first gripper and the gripping of the first end of the protective film by the second gripper may be simultaneously performed.

The method may further include after the gripping of the protective film by the second gripper, increasing a movement speed of the film peeling apparatus.

According to the embodiments, a film peeling apparatus and a method of peeling a film may improve peeling efficiency of a protective film.

According to the embodiments, the film peeling apparatus may directly grip the protective film to perform peeling, and a peeling speed may be improved. Thus, an overall process time may be shortened.

Separation of the peeling tape from the protective film may be prevented in the middle of the process. Thus, equipment errors may be reduced.

A film peeling apparatus and a method of peeling a film may be effectively used for removing a protective film from a large area product.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
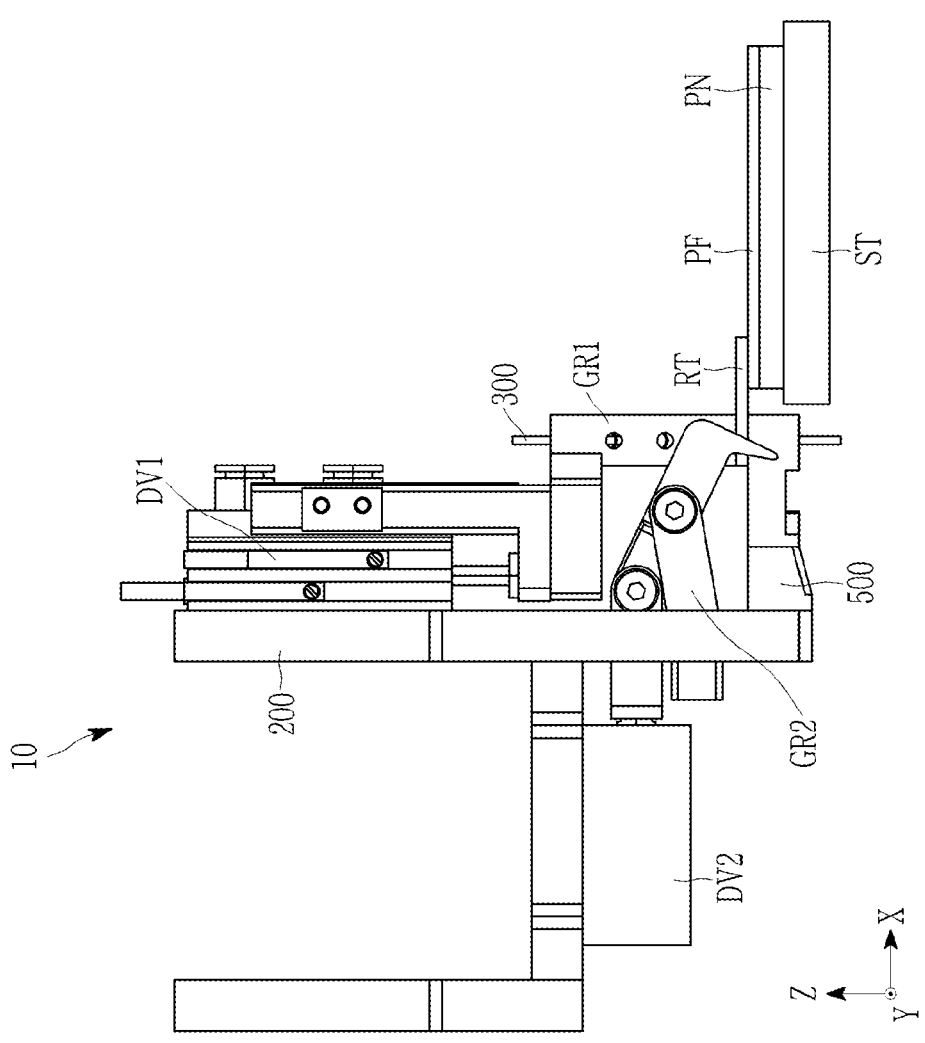
FIG. 1 illustrates a schematic cross-sectional view of a film peeling apparatus according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, such as "a" and "an," are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the disclosure. Further, the blocks, units, and/or modules of some embodiments may be physically combined into more complex blocks, units, and/or modules without departing from the scope of the disclosure.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Further, throughout the specification, the phrase "in a plan view" means when an object portion is viewed from above, and the phrase "in a cross-sectional view" means when a cross-section taken by vertically cutting an object portion is viewed from the side.

Although the terms "first," "second," etc. may be used herein to describe various components, these elements should not be limited by these terms. These terms are used to distinguish one element from another element. Thus, a first element discussed below could be termed a second element without departing from the teachings of the disclosure.

Figure 2:
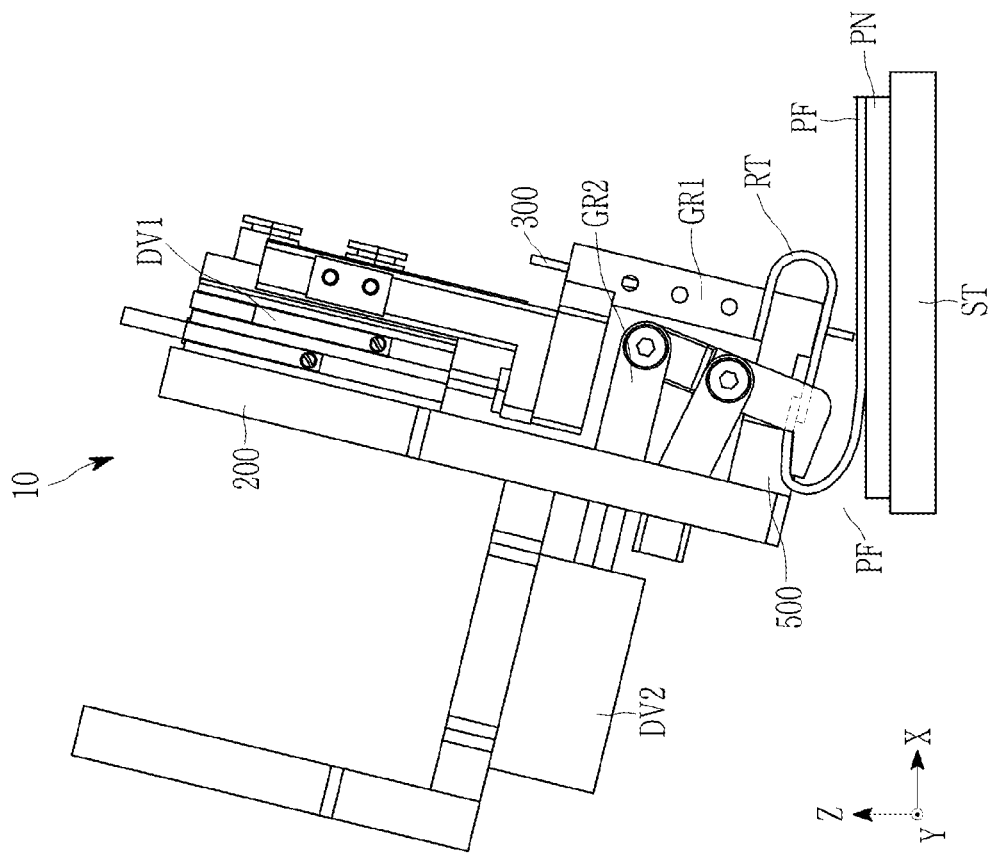
FIG. 2 illustrates a schematic cross-sectional view of a film peeling apparatus according to an embodiment.
Figure 3:
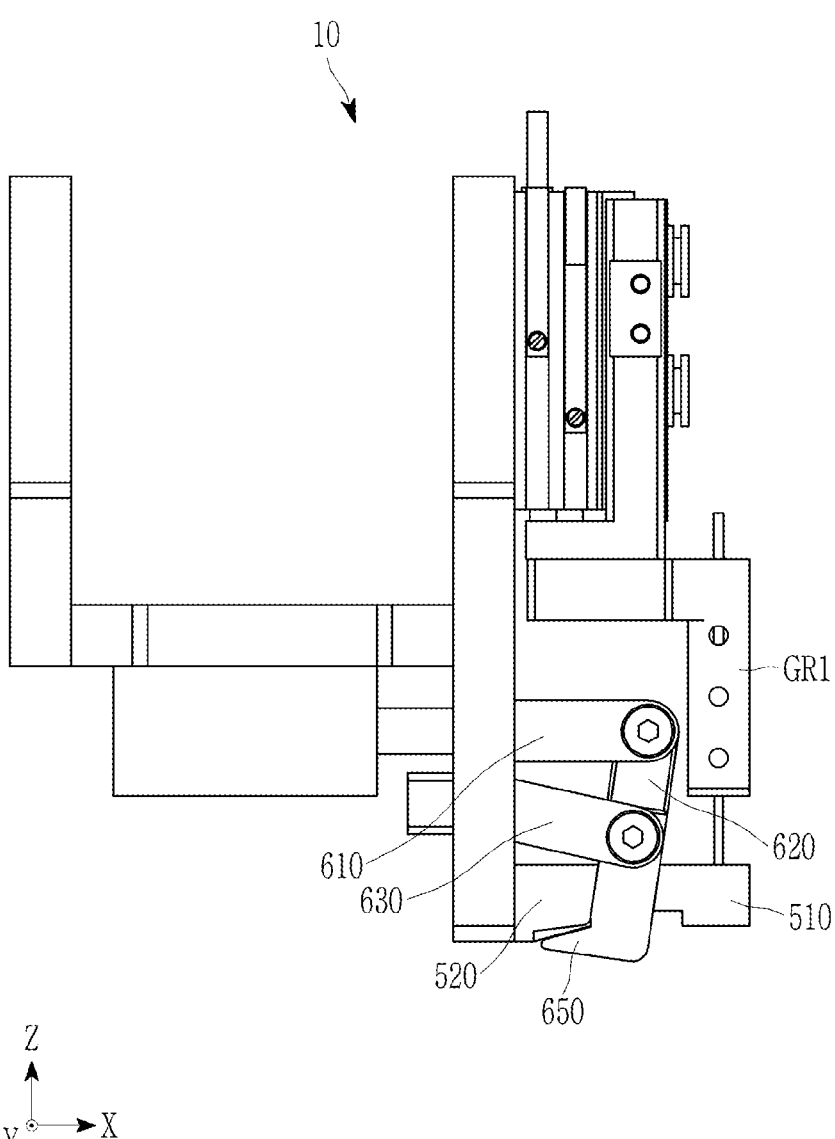
FIG. 3 illustrates a schematic cross-sectional view of a film peeling apparatus according to an embodiment.
Figure 4:
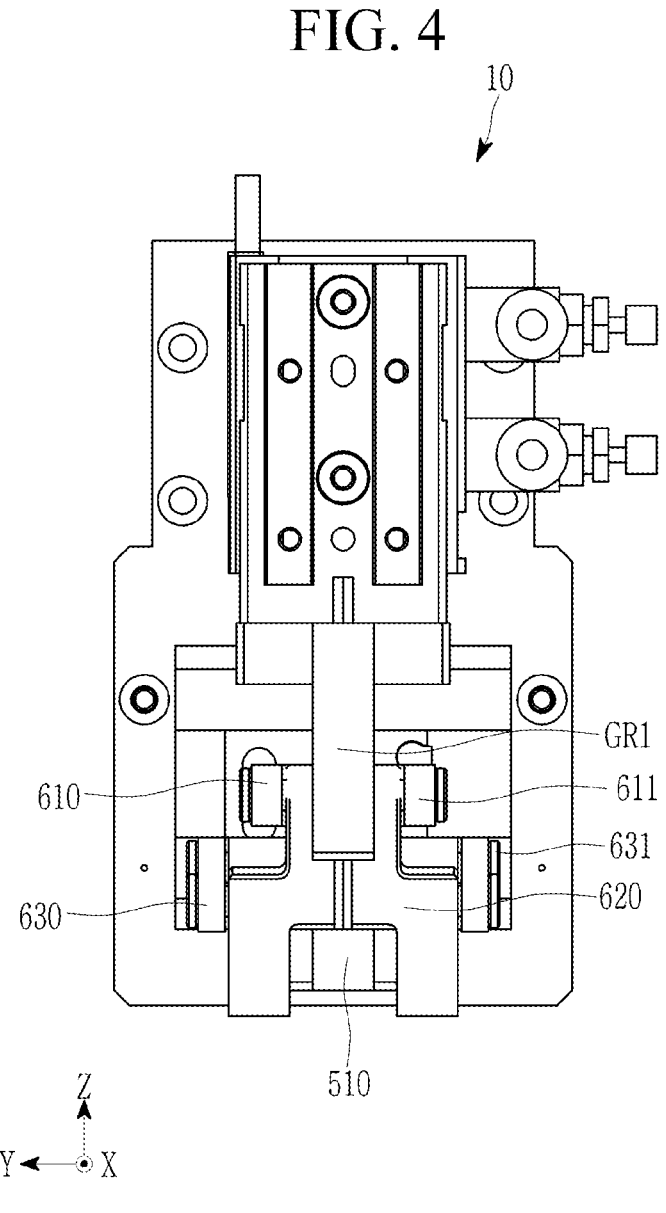
FIG. 4 illustrates a schematic front view of a film peeling apparatus according to an embodiment.
Figure 5:
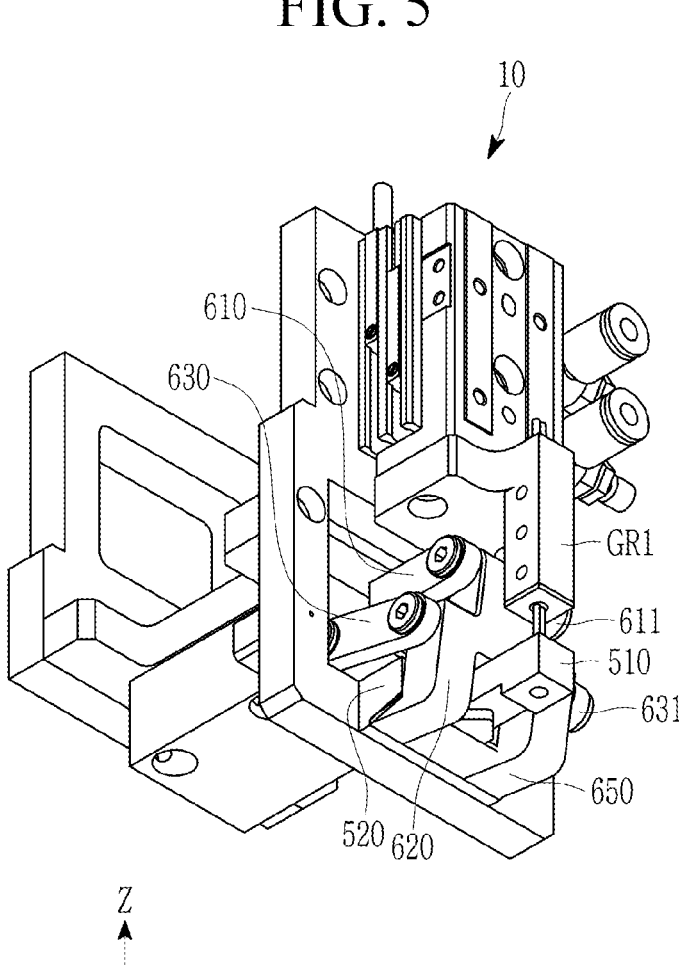
FIG. 5 illustrates a schematic perspective view of a film peeling apparatus according to an embodiment.
Figure 5:
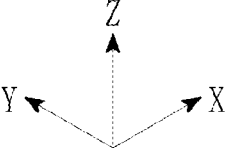
Figure 6:
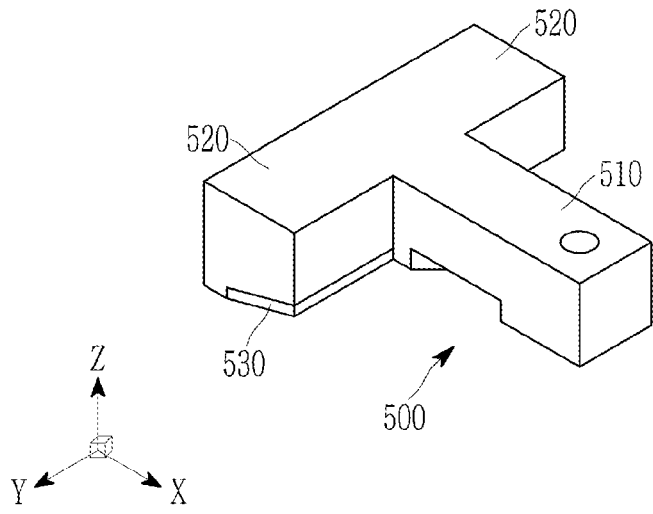
FIG. 6 illustrates a schematic perspective view of a grip support according to an embodiment.

FIG. 1 illustrates a schematic cross-sectional view of a film peeling apparatus according to an embodiment. FIG. 2 illustrates a schematic cross-sectional view of a film peeling apparatus according to an embodiment. FIG. 3 illustrates a schematic cross-sectional view of a film peeling apparatus according to an embodiment. FIG. 4 illustrates a schematic front view of a film peeling apparatus according to an embodiment. FIG. 5 illustrates a schematic perspective view of a film peeling apparatus according to an embodiment. FIG. 6 illustrates a schematic perspective view of a grip support of a film peeling apparatus according to an embodiment.

Referring to FIGS. 1 and 2, the film peeling apparatus 10 according to an embodiment may include a first gripper GR1, a second gripper GR2, a first driver DV1, a second driver DV2, a frame portion 200, and a grip support 500. The first gripper GR1 and the second gripper GR2 may be capable of peeling off a protective film PF attached to a surface of a panel PN mounted in a stage ST. The first driver DV1 may be connected to the first gripper GR1 and control the first gripper GR1 (e.g., a control or operation of the first gripper GR1). The second driver DV2 may be connected to the second gripper GR2 and control the second gripper GR2 (e.g., a control or operation of the second gripper GR2). The first and second drivers DV1 and DV2 may be positioned in the frame portion 200. The grip support 500 may be in contact with the first gripper GR1 and the second gripper GR2 and complete (or perform) a grip operation.

The protective film PF may be attached to at least one surface of the panel PN according to an embodiment, and the protective film PF may include a release tape RT extending to an outside of the panel PN at a first end of the protective film PF. The panel PN may be a component constituting a display device having a surface to which a protective film may be attached. For example, the panel PN may be a display panel, a cover panel, a cover window, and an optical film. For example, the panel PN may be a display panel that displays an image.

The first gripper GR1 may move in a vertical direction (e.g., in a Z-axis direction) depending on a control (or an operation) of the first driver DV1. The first driver DV1 may include an actuator, and the actuator may include a pneumatic or hydraulic cylinder. The first gripper GR1 may further include a film detection sensor 300 that detects whether the protective film PF is gripped.

The second gripper GR2 may perform a link rotation operation depending on a control (or an operation) of the second driver DV2. The second gripper GR2 may be a link type in which a grip bar is connected by multiple links. The first driver DV2 may include an actuator, and the actuator may include a pneumatic or hydraulic cylinder.

The grip support 500 may include a first surface (or an upper surface) and a second surface (or a lower surface) facing each other. In case that the first gripper GR1 and the second gripper GR2 perform a grip operation, the first gripper GR1 and the second gripper GR2 may grip the release tape RT or the protective film PF together with the first gripper GR1 and the second gripper GR2. The first gripper GR1 may fix the release tape RT to a first surface of the grip support 500 and grip the release tape RT. The second gripper GR2 may fix the protective film PF to a second surface of the grip support 500 and grip the protective film PF.

The film peeling apparatus according to an embodiment may further include a peeling position adjuster (not illustrated). The peeling position adjuster (not illustrated) may be connected to a fixed frame 200 and move the first and second grippers GR1 and GR2 in a horizontal direction (e.g., in an X-axis direction or a Y-axis direction) and the vertical direction (e.g., the Z-axis direction) to adjust a grip position for peeling off a protective film PF.

Referring to FIG. 3 to FIG. 5, the second gripper GR2 may be designed to include a grip bar 620 and links 610, 611, 630, and 631. An upper portion of the grip bar 620 may be connected to the upper links 610 and 611. A lower portion of the grip bar 620 may include bent portions 650 at opposite sides of the lower portion of the grip bar 620 and be connected to the lower links 630 and 631. The upper link 610 of the second gripper GR2 may be connected to the second driver DV2, and the lower link 630 may be connected to the frame 200. The grip bar 620 may include the bent portions 650 having an end bent at the lower portion of the grip bar 620. The bent portions 650 and horizontal portions 520 of the grip support 500 may grip the protective film PF. The bent portions 650 may be formed at opposite sides (e.g., opposite ends) at a distance (e.g., a predetermined or selectable distance), and the first gripper GR1 may be positioned between bent portions 650 of the second gripper GR2. Accordingly, after the first gripper GR1 grips the release tape RT, the second gripper GR2 may grip the protective film PF without additional alignment.

FIG. 1 illustrates a schematic cross-sectional view showing the first gripper GR1 of the film peeling apparatus 10, which grips the release tape RT according to an embodiment. The first gripper GR1 may move to a grip position capable of gripping the release tape RT by a peeling position adjuster. For example, the first gripper GR1 may move to the grip position at which the release tape RT may be gripped by the peeling position adjuster. For example, in case that the release tape RT is positioned between the first gripper GR1 and the grip support 500, the first gripper GR1 may descend in the vertical direction (e.g., the Z-axis direction) depending on a control (or an operation) of the first driver DV1, and may bring the release tape RT into contact with the first surface of the grip support 500 and grip the release tape RT. The film detection sensor 300 may detect whether the protective film PF is gripped by the first gripper GR1.

Referring to FIG. 2 to FIG. 5, the first gripper GR1 may grip an end of the release tape RT, and may be inclined at an angle (e.g., a predetermined or selectable angle) and move toward an upper portion of the panel PN. The first gripper GR1 may move in an operation that minimizes the tension applied to the release tape RT in consideration of the peeling angle and the peeling speed. For example, the first gripper GR1 may move in consideration of the peeling angle and the peeling speed and the tension applied to the release tape RT may be minimal. Thus, the separation of the release tape RT from the protective film PF may be prevented.

In case that the first gripper GR1 grips the release tape RT and moves to start a peeling operation, the second gripper GR2 may perform a link rotation operation by the control (or the operation) of the second driver DV2, and may grip the protective film PF. For example, the grip bar 620 and the links 610, 611, 630, and 631 may be connected, and the second gripper GR2 may perform a rotation operation. The bent portions 650 disposed at the opposite sides (e.g., the opposite ends) of the grip bar 620 may bring a portion of the protective film PF into contact with second surfaces of the horizontal portions 520 disposed at opposite sides of the grip support 500. For example, the first gripper GR1 may grip the release tape RT. The film peeling apparatus 10 may start a peeling operation at a first end of the panel PN, and may peel a portion of the protective film PF at a portion to which the release tape RT is attached. The second gripper GR2 may perform rotation operation (or may rotate) by the second driver GV2 through link connection, and may grip (e.g., directly grip) the protective film PF partially peeled by the first gripper GR1. The second gripper GR2 may grip the protective film PF on a portion at which the release tape RT gripped by the first gripper GR1 is attached. Thus, the second gripper GR2 may grip the protective film PF without additional positioning for second grip (or additional grip). After the second gripper GR2 grips a portion of the protective film PF, a movement speed of the film peeling apparatus 10 may be accelerated than before the grip of the second gripper GR2. Accordingly, a protective film peeling speed (e.g., an overall speed of peeling the protective film) of the film peeling apparatus 10 may be improved.

The first gripper GR1 may grip the release tape RT and start the peeling operation, and the second gripper GR2 may grip the protective film PF partially peeled by the first gripper GR1 to start full-scale peeling. However, according to another embodiment, the peeling operation of the first gripper GR1 and the gripping operation of the second gripper GR2 may be simultaneously performed.

Referring to FIGS. 5 and 6, the grip support 500 according to an embodiment may be implemented in a T-shape. The grip support 500 may include a first surface (or an upper surface) and a second surface (or a lower surface) facing each other, and may include a vertical portion 510 and the horizontal portions 520. For example, the vertical portion 510 may be T-shaped. The horizontal portions 520 may be positioned at opposite sides to each other, and the vertical portion 510 may be provided between the horizontal portions 520.

The vertical portion 510 of the grip support 500 and the first gripper GR1 may fix the release tape RT. For example, in case that the first gripper GR1 descends to grip the release tape RT, the first gripper GR1 may bring the release tape RT into contact with a first surface of the vertical portion 510 to grip the release tape RT.

The second gripper GR2 and the horizontal portions 520 at opposite sides of the grip support 500 may fix the protective film PF. For example, the grip bar 620 and the links 610, 611, 630, and 631 may be connected, and the second gripper GR2 may perform a rotation operation (e.g., through the connection of the grip bar 620 and the links 610, 611, 630, and 631) The bent portions 650 may be formed by bending the opposite sides (e.g., the opposite ends) of the grip bar 620, and bring the protective film PN into contact with a second surface of the grip support 500. Thus, the second gripper GR2 may grip the protective film PN. The horizontal portions 520 disposed at the opposite sides of the grip support 500 may include an anti-slip portion 530 for preventing the protective film PF from sliding and for being well fixed to the grip support 500 during the gripping of the protective film PF. The anti-slip portion 530 may form the second surface of the grip support 500. For example, the anti-slip portion 530 may be disposed on the second surface of the grip support 500. The anti-slip portion 530 may be formed of polymer resin, e.g., a urethane material.

Figure 7:
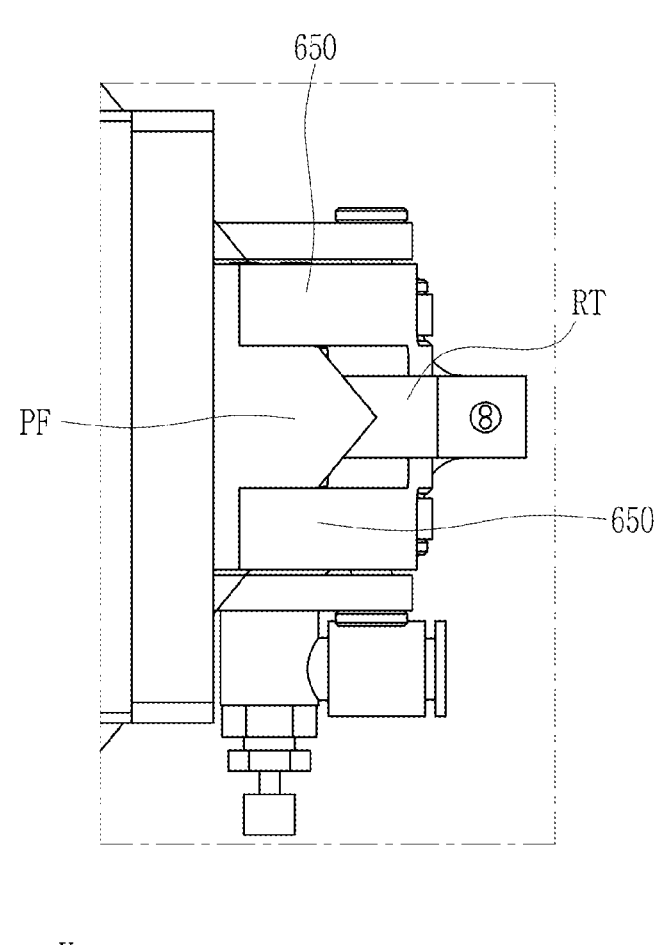
FIG. 7 schematically illustrates a film peeling apparatus that grips a protective film from below according to an embodiment.

FIG. 7 illustrates a schematic view from below showing a state in which both the release tape and the protective film are gripped by the first and second grippers in the embodiment of FIG. 2. Referring to FIGS. 2 and 7, the release tape RT may be gripped by the first gripper GR1, and a portion of the protective film PF at a portion to which the release tape RT is attached may be gripped by the bent portions 650 at opposite sides of the second gripper GR2. Accordingly, the film peeling apparatus may grip the release tape RT and the protective film PF and may perform the peeling. Thus, a peeling rate may be improved, and the separation of the release tape RT in the middle of the process. The film peeling apparatus may be effectively used and remove the protective film PF of a large area product.

Figure 8:
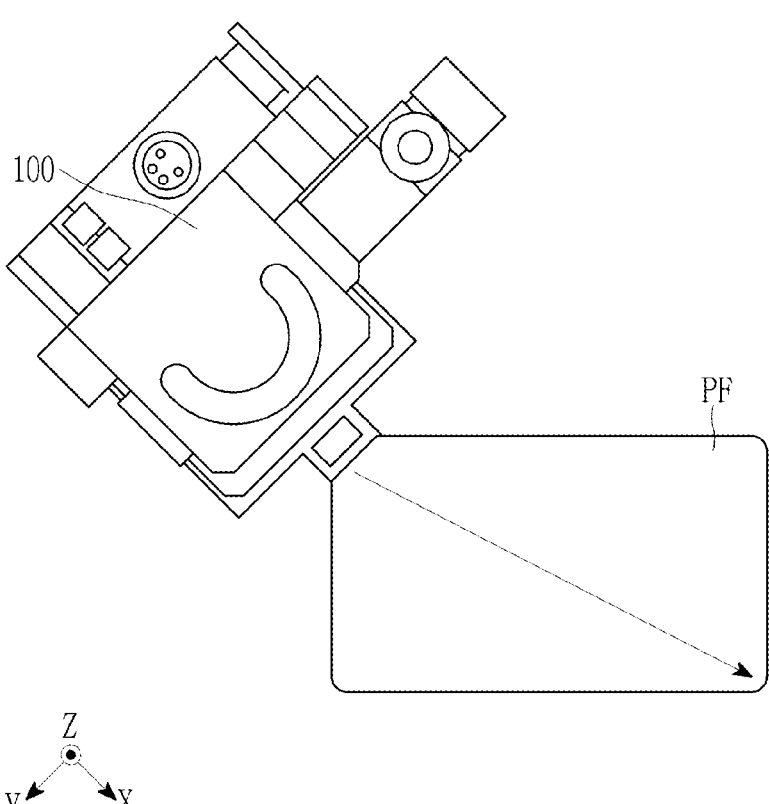
FIG. 8 schematically illustrates a film peeling operation of a film peeling apparatus from above according to an embodiment.

FIG. 8 schematically illustrates a film peeling operation of a film peeling apparatus according to an embodiment. When both the release tape RT and the protective film PF are gripped by the first and second grippers GR1 and GR2 of the film peeling apparatus 10 according to an embodiment, the film peeling apparatus 10 may move in a direction from an upper portion of the panel PN, and may completely remove the protective film PF.

Figure 9A:
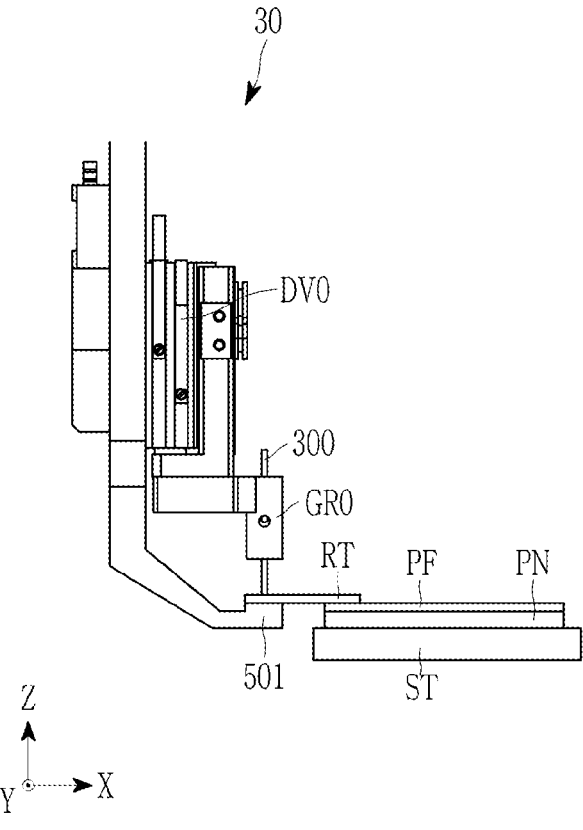
FIGS. 9A and 9B each illustrate a schematic cross-sectional view of a film peeling apparatus according to a comparative embodiment.
Figure 9B:
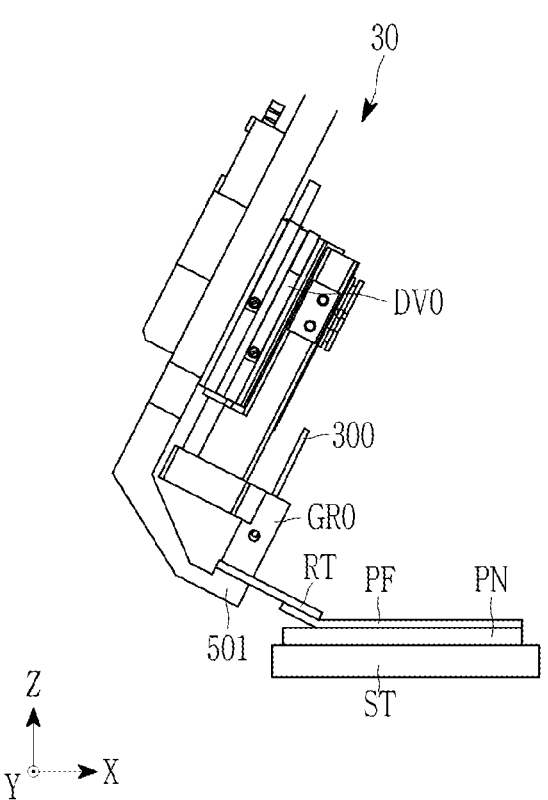
Figure 10A:
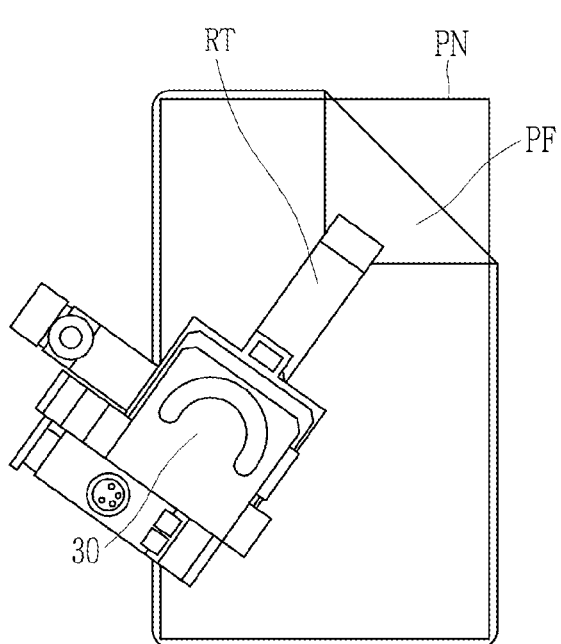
FIGS. 10A and 10B schematically illustrates an operation of a film peeling apparatus from above according to a comparative embodiment.
Figure 10A:
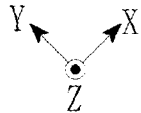
Figure 10B:
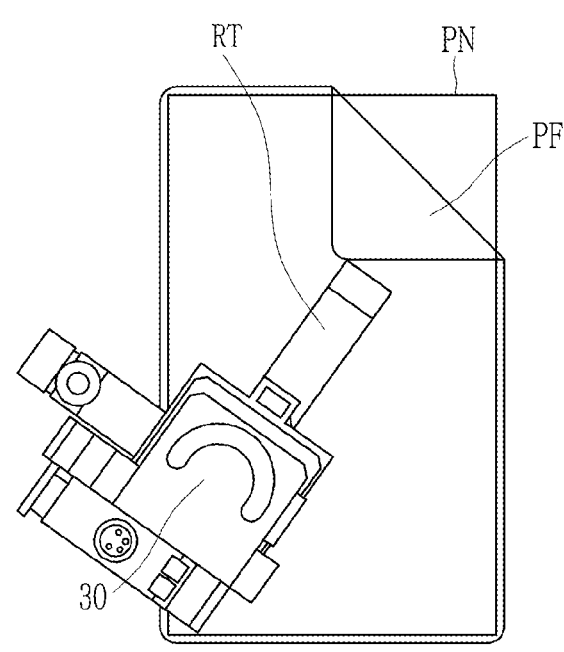
Figure 10B:
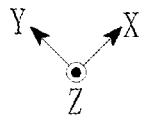

Hereinafter, an operation of the film peeling apparatus according to an embodiment is described with reference to FIGS. 1 and 8 to 10. FIGS. 9A and 9B each illustrate a cross-sectional view of a film peeling apparatus according to a comparative embodiment. FIGS. 10A and 10B each illustrates a peeling operation of a film peeling apparatus according to a comparative embodiment.

The film peeling apparatus 30 according to the comparative embodiment may include a gripper GR0, a driver DV0, and a grip support 501. The gripper GR0 may peel off a protective film PF attached to an upper portion of a panel PN positioned in a stage ST. The driver DV0 and the grip support 501 may be connected to the gripper GR0. The gripper GV0 may be connected to the driver DV0 and move in a vertical direction (e.g., in a Z-axis direction). The gripper GV0 may bring a release tape RT into contact with the grip support 501 and may grip the release tape RT.

Referring to FIG. 9A, the gripper GV0 of the comparative embodiment is moved to a grip position at which the release tape RT may be gripped by a peeling position adjuster. In case that the release tape RT is positioned between the gripper GV0 and the grip support 501, the gripper GV0 may descend depending on a control (or an operation) of the driver DV0 and grip an end of the release tape RT. Referring to FIG. 9B, in a peeling operation of the protective film PF, the film peeling apparatus 30 according to the comparative embodiment may grip an end of the release tape RT and move to the upper portion of the panel PN.

Referring to FIGS. 10A and 10B, the film peeling apparatus 30 according to the comparative embodiment may move in a direction from a first end to a second end of the panel PN and remove (e.g., entirely remove) the protective film PF. In the peeling operation of the film peeling apparatus 30 according to the comparative embodiment, the film peeling apparatus 30 may grip only the release tape RT attached to the protective film PF and extend to the outside of the panel PN without directly gripping the protective film PF. Thus, during the process, the release tape RT may be separated from the protective film PF. A movement speed of the film peeling apparatus 30 may be slowed to prevent separation of the release tape RT. The slowed movement speed may be inefficient and may not be suitable for peeling a large area film.

However, referring to FIG. 1 to FIG. 8, the film peeling apparatus 10 according to an embodiment may grip (e.g., directly grip) portions of the protective film PF and the release tape RT to perform the peeling operation. Thus, the peeling speed may be improved, and an overall process time may be decreased. The protective film PF may be gripped (e.g., directly gripped), and separation of the release tape RF from the protective film PF may be prevented during the process (or the peeling operation). Thus, equipment errors may be reduced. The protective film PF may be effectively removed in a large area product.

Figure 11:
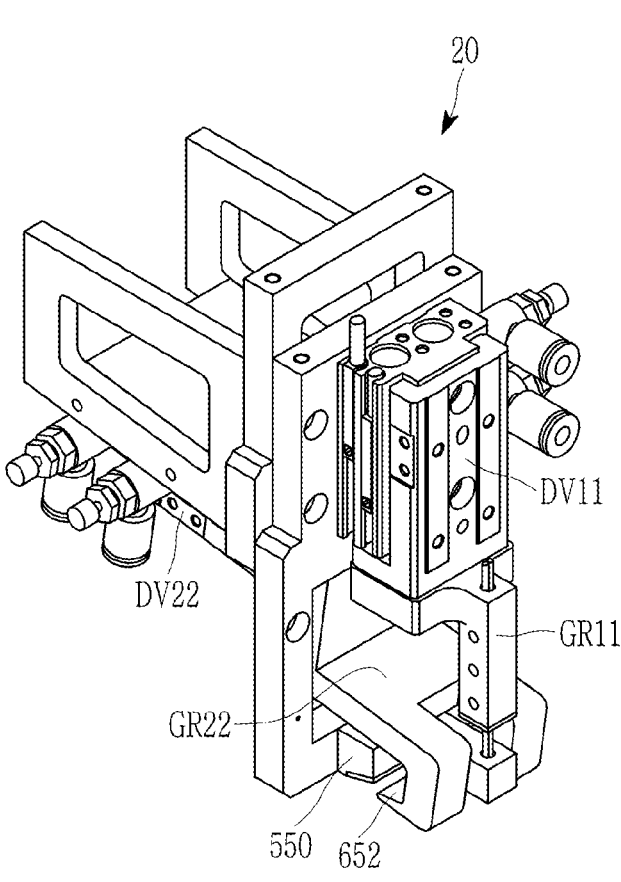
FIG. 11 illustrates a schematic perspective view of a film peeling apparatus according to an embodiment.

A film peeling apparatus according to an embodiment is described with reference to FIG. 11. A detailed description of the same constituent elements is omitted.

The film peeling apparatus 20 according to an embodiment may include a first gripper GR11, a second gripper GR22, a first driver DV11, and a second driver DV22. The first gripper GR11 and the second gripper GR22 may peel off the protective film attached to an upper portion of the panel. The first driver DV11 may be connected to the first gripper GR11 and control an operation of the first gripper GR11. The second driver DV22 may be connected to the second gripper GR22 and control an operation of the second gripper GR22.

The first gripper GR11 may move to a grip position at which the release tape RT may be gripped by a peeling position adjuster. In case that the release tape RT is positioned between the first gripper GR11 and the vertical portion of the grip support 550, the first gripper GR11 may descend depending on a control (or an operation) of the first driver DV11. The first gripper GR11 may bring the release tape RT into contact with an upper surface of the vertical portion of the grip support 550 and fix the release tape RT.

According to an embodiment, the second gripper GR22 may be connected to the second driver DV22 and perform a straight line motion. For example, the second gripper GR22 may move along a straight line. The second driver DV22 may include an actuator, and the actuator may include a pneumatic or hydraulic cylinder. The second gripper GR22 may include a bent portion 652 at an end thereof. The first gripper GR11 may grip the release tape to start the peeling operation. The second gripper GR22 may linearly move depending on a control (or an operation) of the second driver DV22 to grip (e.g., directly grip) an end of the protective film PF. The second gripper DV22 may be driven and pull the protective film PF toward the grip support 550. Accordingly, the bent portion 652 of the second gripper DV22 may bring the protective film PF into contact with lower surfaces of opposite horizontal portions of the grip support 550 and may fix the protective film PF to the grip support 550.

The film peeling apparatus 20 according to an embodiment may grip the protective film PF by the second gripper GR22. The first gripper GR11 may move at a faster speed than an initial speed at which the first gripper GR11 grips the release tape RT and moves. Thus, the protective film PF attached to the panel PN may be completely removed.

Figure 12:
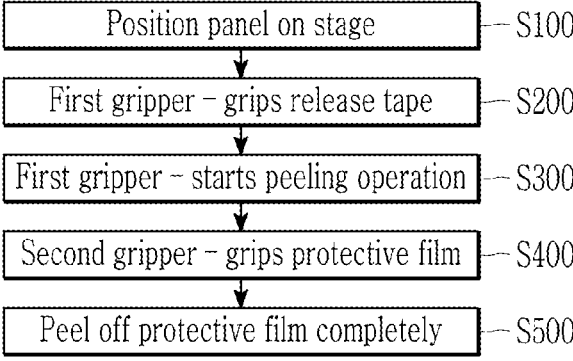
FIG. 12 schematically illustrates a film peeling flowchart of a film peeling apparatus according to an embodiment.

Detailed description of a method of peeling a film according to an embodiment is described with reference to FIG. 12.

A panel to which a protective film is attached may be positioned on a stage (S100). In an embodiment, the panel may include a protective film attached to at least one surface, and a release tape attached to an end of the protective film and extending to an outside of the panel. The film peeling apparatus may move to a position at which the release tape may be attached to an end of the protective film. The film peeling apparatus may include a first gripper and a second gripper, and the first gripper may move to a position at which the release tape may be gripped by the peeling position adjuster to align the grip position.

In case that the positioning of the panel is completed to place the release tape between the first gripper and a grip support, the first gripper may descend and grip the release tape and come into contact with the grip support depending on a control (or an operation) of a first driver of the first gripper (S200). A film detection sensor positioned in the first gripper may detect whether the release tape is gripped.

The first gripper gripping the release tape, which forms an angle (e.g., a predetermined or selectable angle), may move to an upper portion of the panel to which the protective film is attached, peeling of the protective film may be started (S300). For example, the release tape gripped by the first gripper may be inclined at the angle and move to the upper portion of the panel to which the protective film is attached, and the peeling of the protective film may be started (S300). The film peeling apparatus may perform a peeling operation in consideration of a movement speed and a peeling angle such that the release tape attached to the protective film may not be separated from the protective film. For example, the film peeling apparatus may peel the protective film at the movement speed and the peeling angle at which the release tape is attached to the protective film.

The second gripper may grip (e.g., directly grip) the protective film partially peeled off by the first gripper (S400). According to another embodiment, the second gripper may grip the protective film while performing a rotation operation in a link type. For example, the second gripper may include rotatable links and grip the protective film. In other embodiments, the second gripper may grip the protective film while connected to a cylinder to perform a straight line motion. For example, the second gripper may include the cylinder of the straight line motion and grip the protective film. After the second gripper grips the protective film, the movement speed of the film peeling apparatus may be higher than a speed at which the first gripper initiates the peeling operation after gripping the release tape. For example, the film peeling apparatus may have two movement speeds including the initial speed at which the first gripper grips the release tape and the higher speed at which the second gripper grips the protective film.

In case that gripping operations of the first and second grippers are completed, the film peeling apparatus including the first and second grippers may move the upper portion of the panel in a direction to completely remove the protective film (S500). An operation of peeling the protective film by the first gripper after gripping the release tape and an operation of gripping the protective film by the second gripper are sequentially performed. In other embodiments, the operation of the protective film by the first gripper after gripping the release tape and the operation of gripping the protective film by the second gripper may be simultaneously performed.

As described above, in the film peeling apparatus according to an embodiment, the first gripper may grip the release tape attached to an end of the protective film. The protective film may be inclined at an angle (e.g., a predetermined or selectable angle) by the first gripper. The first gripper may start peeling the protective film, which is inclined at the angle at an end of the panel. The second gripper may grip a portion of the peeled protective film to start the peeling operation. For example, the peeling operation may be substantially started after the second gripper grips the portion of the peeled protective film. Thus, equipment errors due to detachment of the release tape may be reduced, and the operation rate may be improved. Since the film peeling apparatus moves after gripping the protective film directly, the peeling speed may be improved and the process time may be reduced. The film may be readily peeled in a product having a large area with a large release force.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A film peeling apparatus comprising:
a frame;
a first driver and a second driver connected to the frame;
a first gripper connected to the first driver;
a second gripper connected to the second driver; and
a grip support spaced apart from the first gripper and the second gripper, wherein
the grip support and the first gripper grip a release tape attached to an end of a protective film attached to a panel and extending to an outside of the panel, and
the grip support and the second gripper grip the end of the protective film to which the release tape is attached,
the second gripper includes at least one rotating link, and
wherein the grip support includes a first surface and a second surface opposing the first surface, the first surface is in contact with the first gripper, and the second surface is in contact with the second gripper.

2. The film peeling apparatus of claim 1, wherein
the grip support includes an anti-slip portion, and
the anti-slip portion forms a second surface of the grip support.

3. The film peeling apparatus of claim 1, wherein the first gripper brings the release tape into contact with the first surface of the grip support and grips the release tape depending on a control of the first driver.

4. The film peeling apparatus of claim 1, wherein the first gripper further includes a film detection sensor that detects whether the release tape is gripped.

5. A film peeling apparatus comprising:
a frame;
a first driver and a second driver connected to the frame;
a first gripper connected to the first driver;
a second gripper connected to the second driver; and
a grip support spaced apart from the first gripper and the second gripper, wherein
the grip support and the first gripper grip a release tape attached to an end of a protective film attached to a panel and extending to an outside of the panel,
the grip support and the second gripper grip the end of the protective film to which the release tape is attached, and
the second gripper includes a plurality of links that rotate depending on a control of the second driver.

6. The film peeling apparatus of claim 5, wherein the second gripper includes a grip bar connected to the links and including a bent portion at an end of the grip bar.

7. The film peeling apparatus of claim 6, wherein the bent portion of the second gripper brings the protective film into contact with the second surface of the grip support and grips the protective film depending on a control of the second driver.

8. A film peeling apparatus comprising:
a frame;
a first driver and a second driver connected to the frame;
a first gripper connected to the first driver;
a second gripper connected to the second driver; and
a grip support spaced apart from the first gripper and the second gripper, wherein
the grip support and the first gripper grip a release tape attached to an end of a protective film attached to a panel and extending to an outside of the panel, the grip support and the second gripper grip the end of the protective film to which the release tape is attached, the grip support includes:

a first surface; and a second surface facing the first surface, the first surface is in contact with the first gripper, the second surface is in contact with the second gripper, the second gripper includes a bent portion at an end of the second gripper, and the second driver horizontally moves the second gripper so that the bent portion of the second gripper is in contact with the second surface of the grip support.

9. The film peeling apparatus of claim 1, wherein the first gripper grips the release tape and moves to peel a portion of the protective film.

10. The film peeling apparatus of claim 9, wherein the second gripper grips the portion of the protective film peeled off by the first gripper.

11. The film peeling apparatus of claim 10, wherein the first gripper and the second gripper simultaneously peel the portion of the protective film.

\* \* \* \* \*